Figure 1:
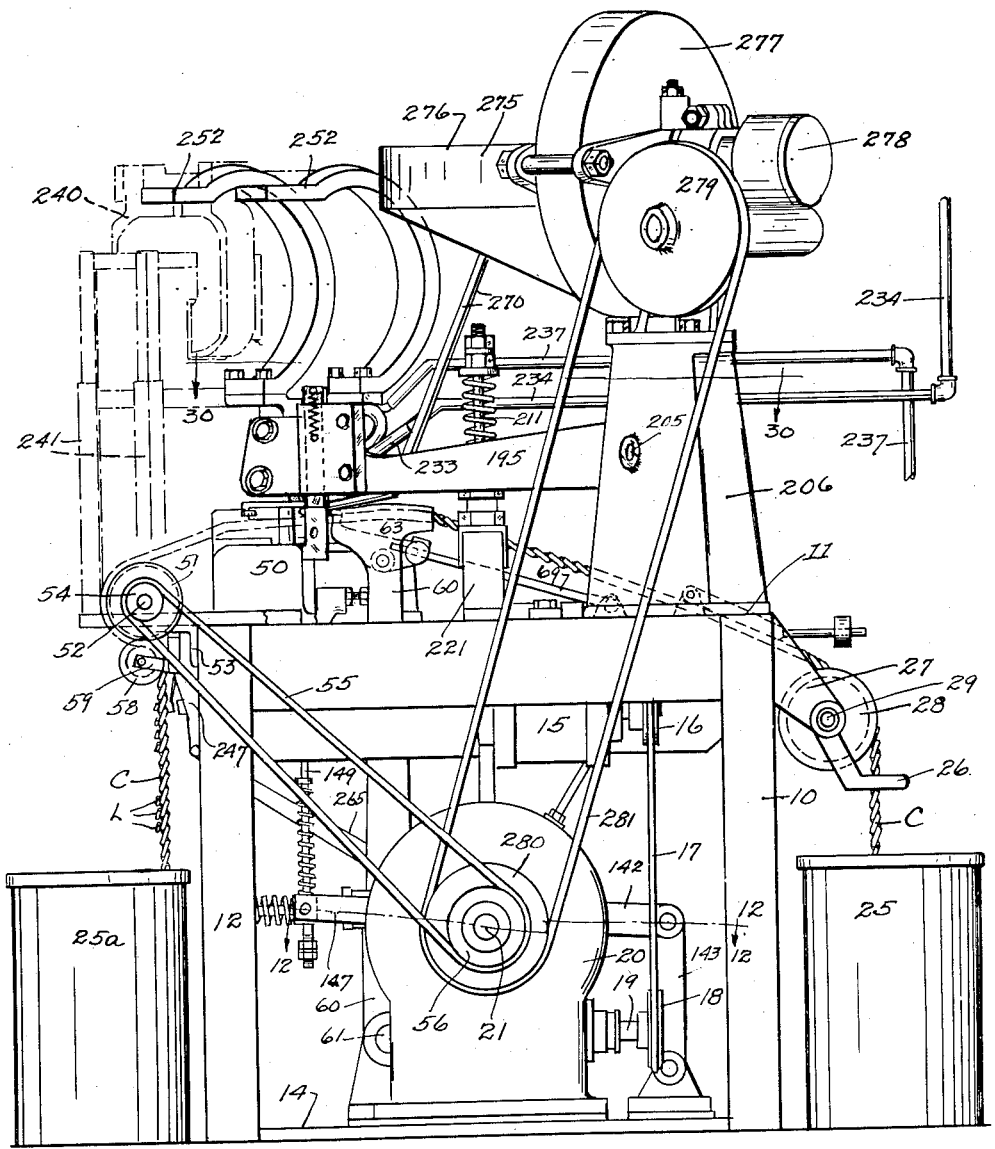

March 14, 1933.  M. R. WELLS  1,901,212
ELECTRIC WELDING MACHINE
Filed March 5, 1931  10 Sheets-Sheet 1

Inventor
Merritt R. Wells
By Bates, Goldrick & Teare
Attorneys

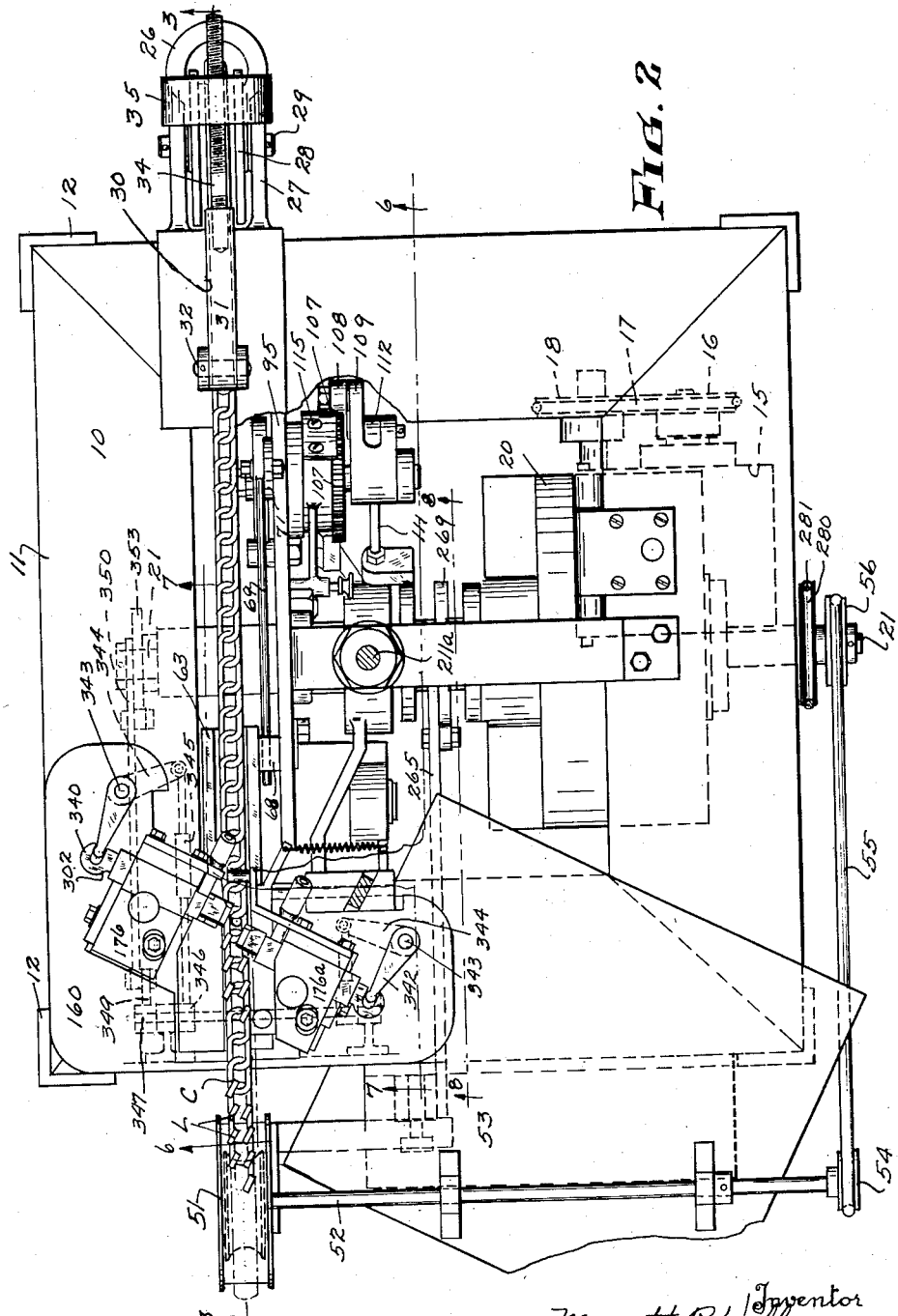

March 14, 1933.                M. R. WELLS                1,901,212
                        ELECTRIC WELDING MACHINE
                Filed March 5, 1931          10 Sheets-Sheet 3
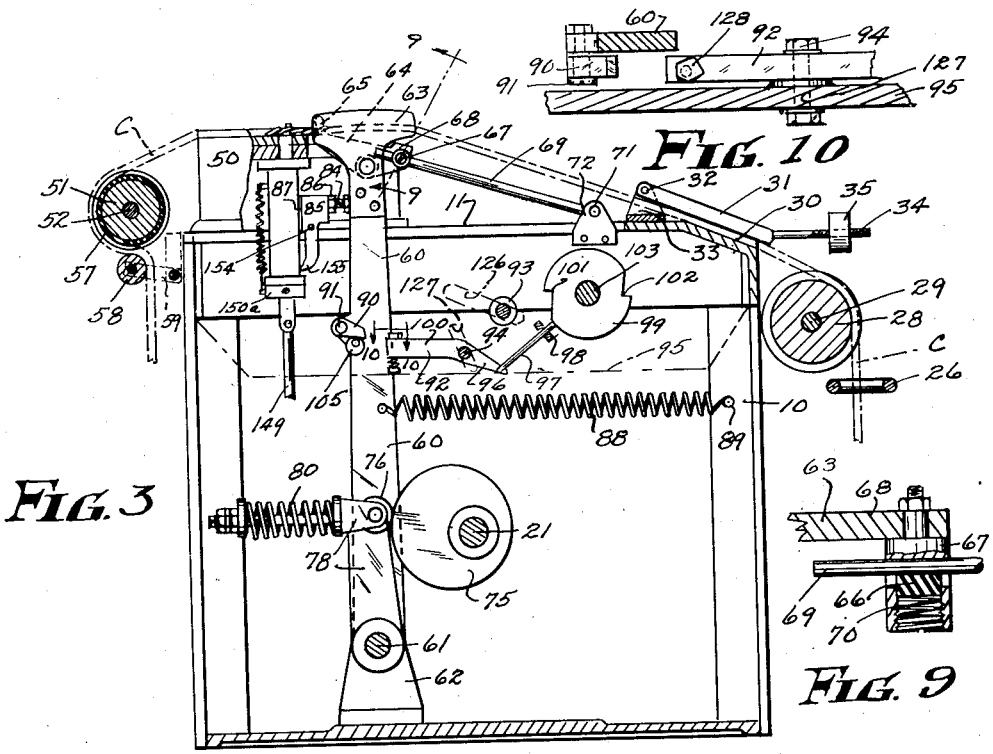
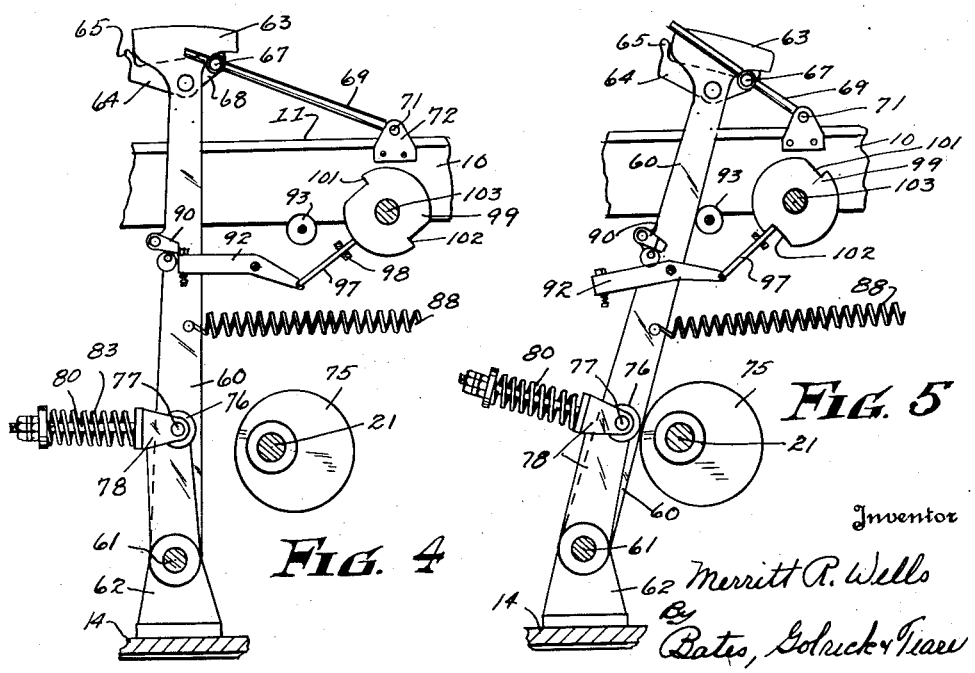
Inventor
Merritt R. Wells
By Bates, Golrick & Ticare
Attorneys March 14, 1933. M. R. WELLS 1,901,212
ELECTRIC WELDING MACHINE
Filed March 5, 1931 10 Sheets-Sheet 4
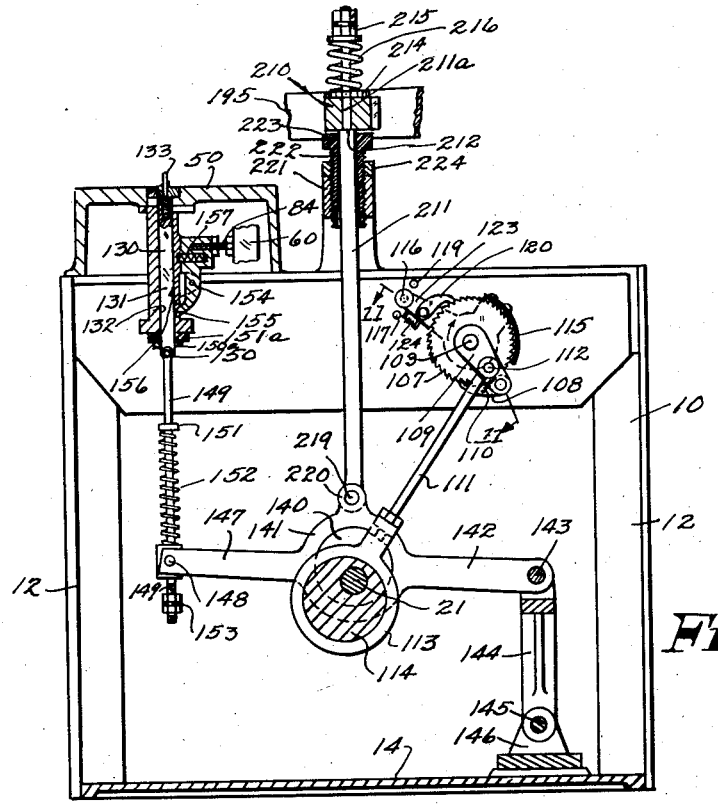
FIG. 6
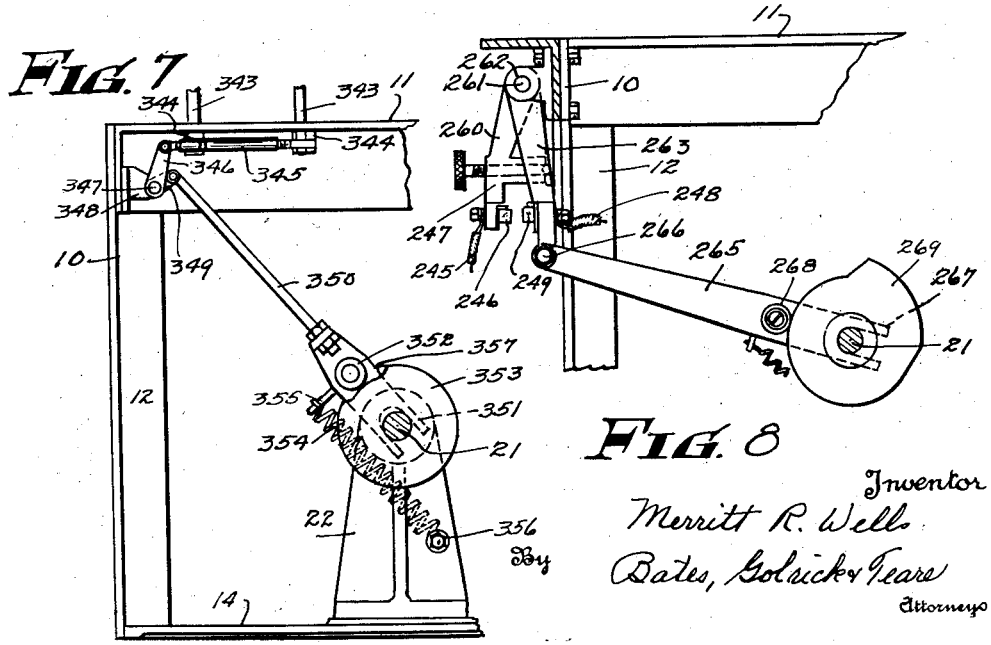
FIG. 7
FIG. 8
Inventor
Merritt R. Wells
By Bates, Goldrick & Teare
Attorneys

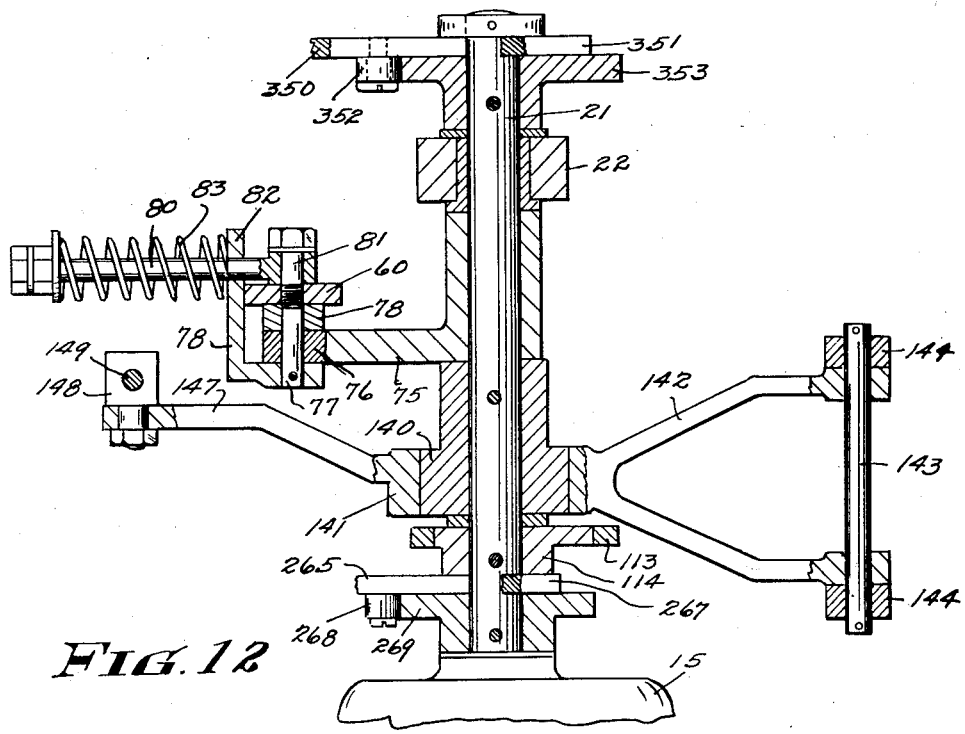
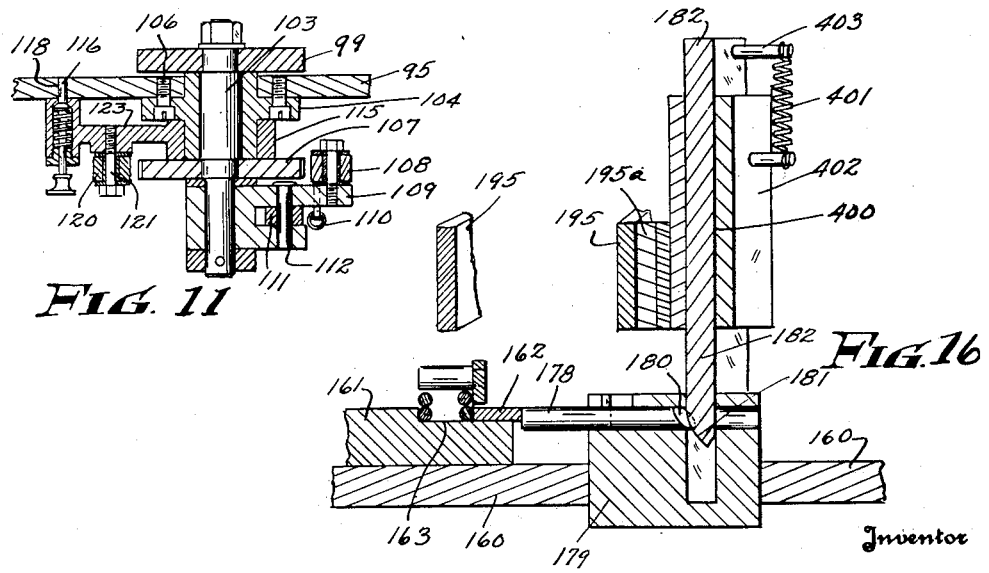

March 14, 1933.  M. R. WELLS  1,901,212
ELECTRIC WELDING MACHINE
Filed March 5, 1931   10 Sheets-Sheet 6
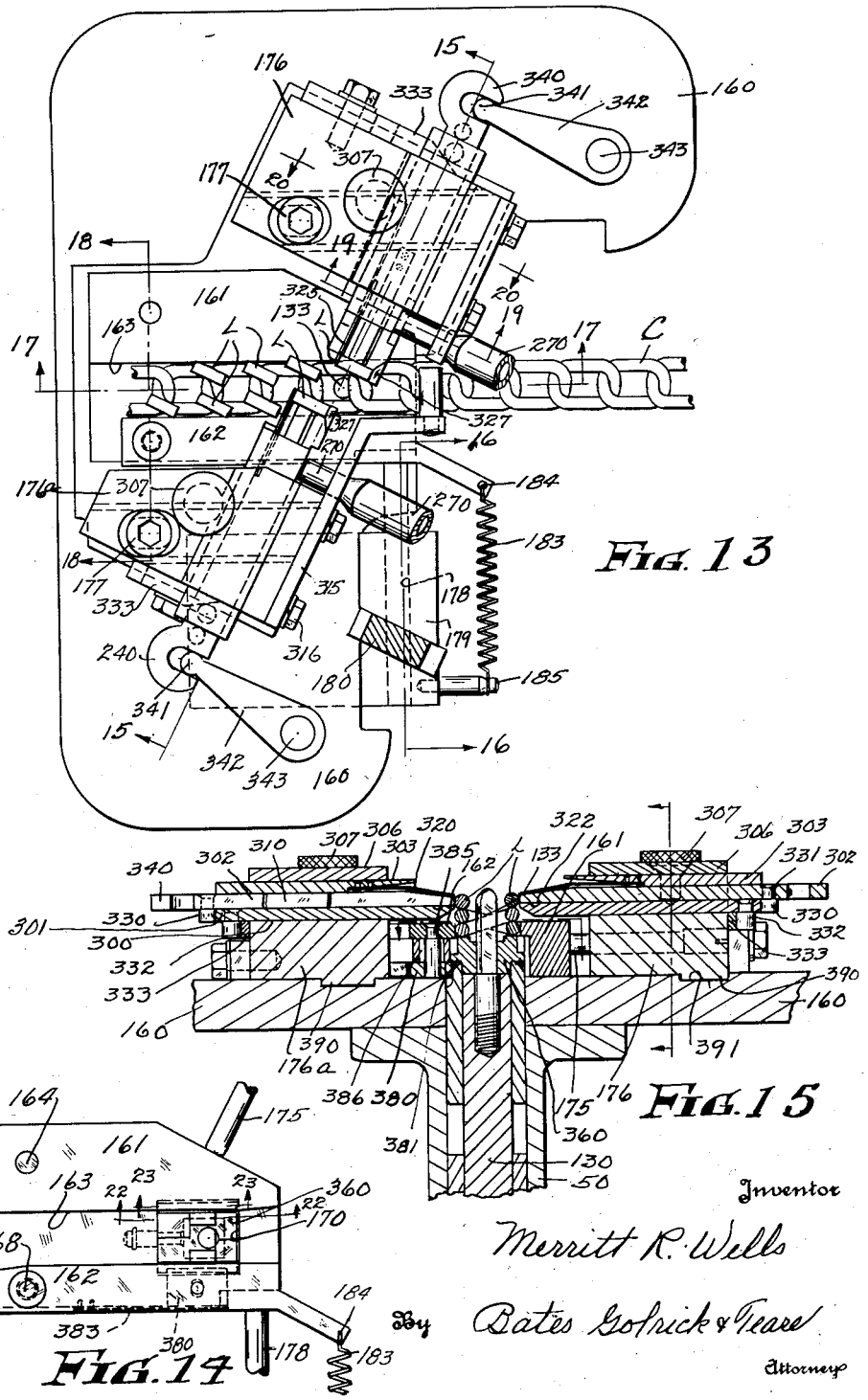

March 14, 1933.  M. R. WELLS  1,901,212
ELECTRIC WELDING MACHINE
Filed March 5, 1931  10 Sheets-Sheet 7
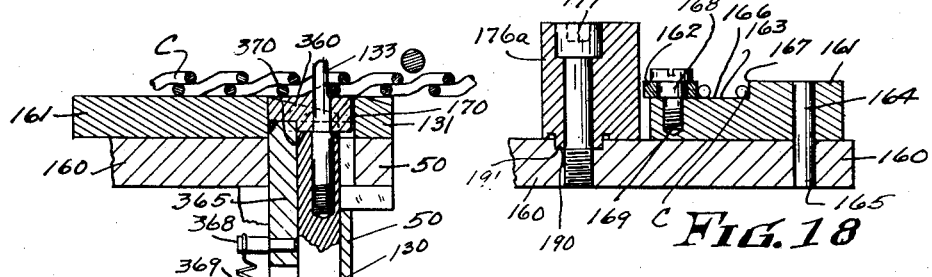
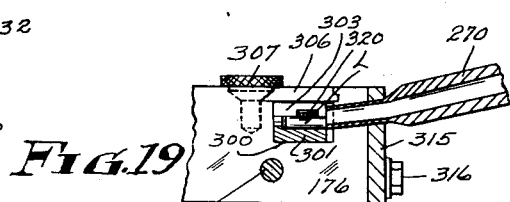
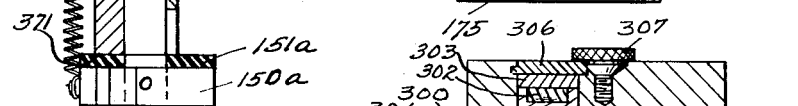
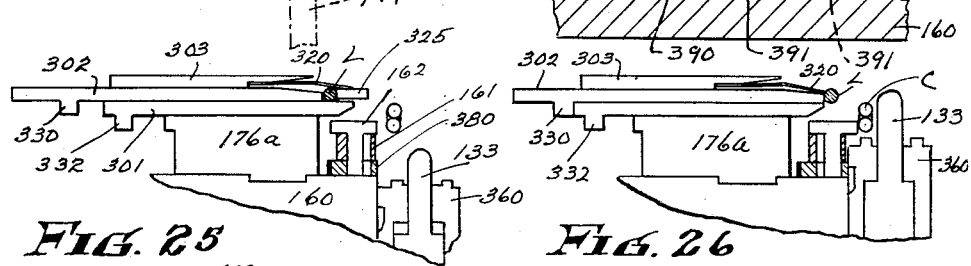
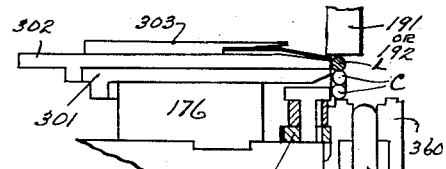
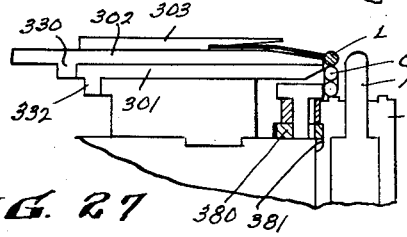
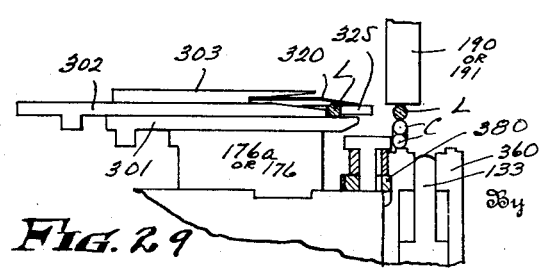
Inventor
Merritt R Wells
Bates, Golrick & Teare
Attorneys March 14, 1933. M. R. WELLS 1,901,212
ELECTRIC WELDING MACHINE
Filed March 5, 1931 10 Sheets-Sheet 8
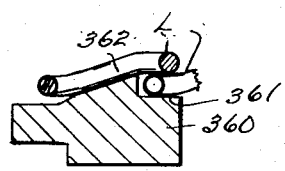
FIG. 22
FIG. 23
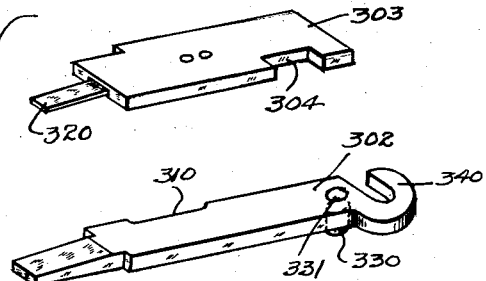
FIG. 24
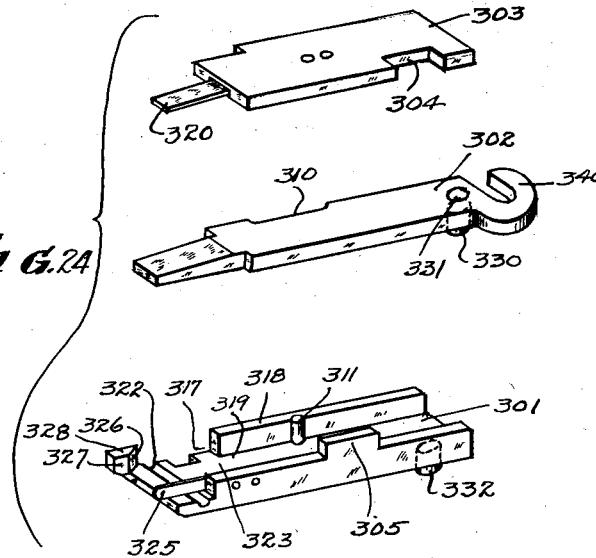
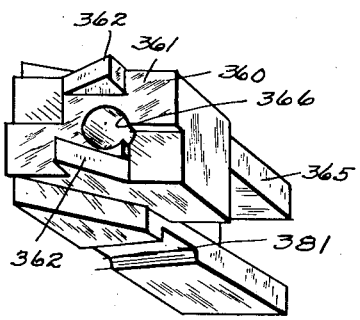
FIG. 21
Inventor
Merritt R. Wells
By Bates, Golrick & Teare
Attorney

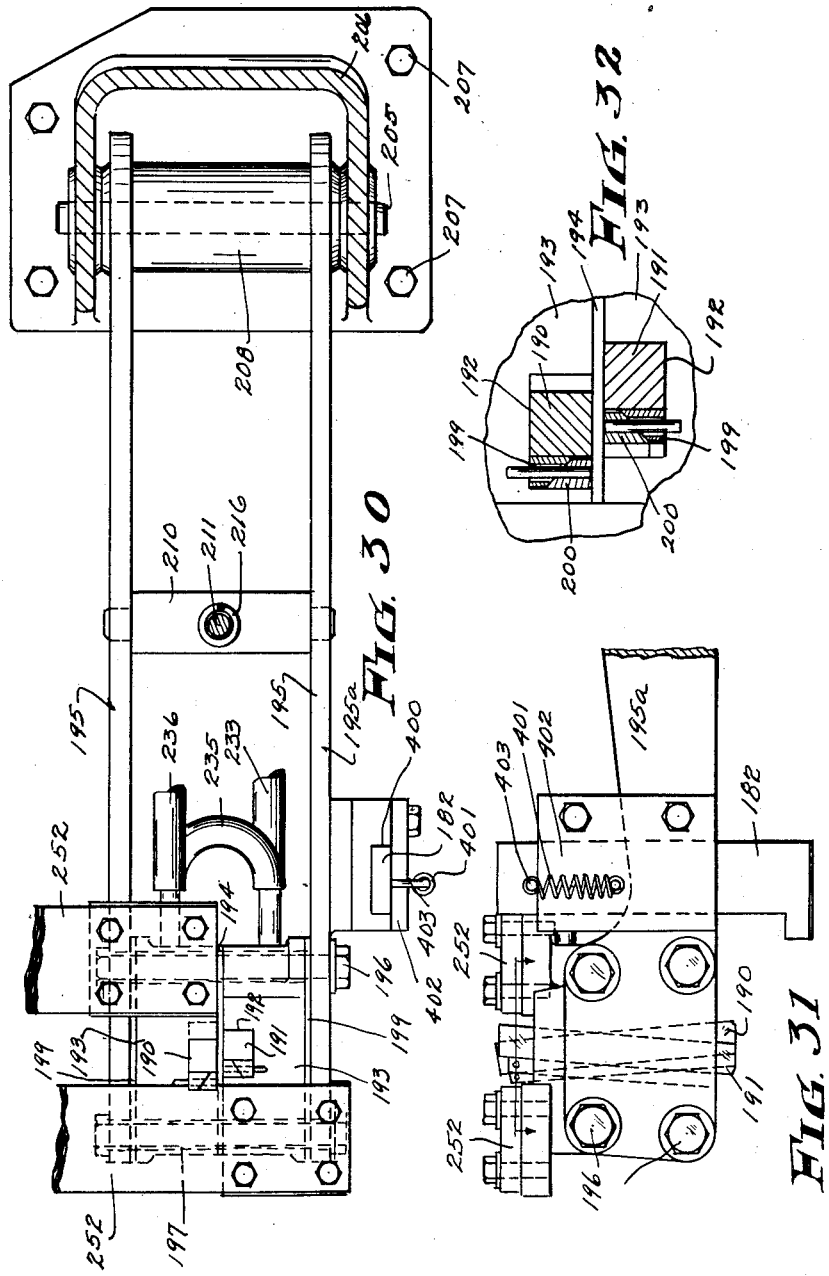

Patented Mar. 14, 1933

1,901,212

UNITED STATES PATENT OFFICE

MERRITT R. WELLS, OF CLEVELAND HEIGHTS, OHIO, ASSIGNOR, BY MESNE ASSIGNMENTS, TO THE McKAY COMPANY, OF PITTSBURGH, PENNSYLVANIA, A CORPORATION OF PENNSYLVANIA

ELECTRIC WELDING MACHINE

Application filed March 5, 1931. Serial No. 520,191.

This invention relates to an apparatus for electrically welding metal parts together, and particularly for the welding of metallic lugs to links of a chain. The present invention is in the nature of an improvement of the welding apparatus disclosed in my application Serial No. 502,362, filed December 15th, 1930.

Heretofore, it has been found difficult to weld lugs to links of a substantially continuous stretch of chain where the links of the chain are not uniform. In less costly chains, especially in chains where the links of the chains themselves were formed by a welding operation, there is often an enlarged cross-sectional portion or bulge at the point of weld. This enlargement at times is on the outside of the link, and again it will be on the inside, and likewise, in one link the weld may appear on the right hand side of the chain and on the next link it may appear on the left hand side of the chain. This results in a lack of uniformity of the chain itself, and makes it difficult to accurately position the links as well as the lugs on the links.

The lack of uniformity in the links is not of itself particularly disadvantageous for many purposes, such as the cross chains of anti-skid tires devices for automobiles, but where lugs are to be welded to the links it is essential in obtaining a good weld that there be accuracy in the presentation of the lugs to the links. Also, the lugs must be properly positioned relatively to each other so that they will obtain a proper engagement with the road surface.

The lack of uniformity of the links becomes particularly troublesome where the lugs are to be welded to diagonally opposite corners of the links, as it permits the links to twist in the welding channel or bed, and thereby causes the lugs to be placed on the links at various angles and often the link twists in its guideway to such an extent that the area of contact of the lug with the link is such that a good weld is prevented.

The general object of this invention is to provide a welding apparatus which will weld lugs to the links of a chain, the links of which are lacking in uniformity due to the processes used in the manufacture of the link.

Another object is to provide a welding mechanism which will weld lugs to links of a chain and which apparatus is adapted to weld lugs on links of chains wherein the links of one chain differ in length from the links in other chains, and which apparatus is so constructed as to position the lugs on the chain, relative to the length of the link and at various predetermined positions thereon.

A further object is to provide a mechanism for welding lugs to a chain which mechanism will feed and position the lugs on the chain and retain the lugs in position until they have been gripped by the electrode mechanism.

Another object is to provide a welding bed which will prevent undue distortion, twisting and subsequent deforming of the link during the welding operation.

The embodiment of my apparatus, illustrated in the drawings, comprises means for feeding a continuous length of chain to a suitable welding mechanism to which the individual lugs are fed, preferably a pair at a time. Thereafter, means are provided for simultaneously welding the pair of lugs to the diagonally opposite corners of the links. The chain is then advanced a distance of one link, and the operation repeated until the desired number of lugged links have been provided. Then, at one operation of the feeding means, the desired number of links are fed to provide for the unlugged links of the chain.

In making up the individual cross chains, I sever the chain as above produced in the regions of the unlugged portions into small sections, which constitute the main portion of the cross-chain members of the tire chain. These cross-chains thus comprise a central portion having links to which the lugs have been welded, and end portions which have no lugs. Hook links are then secured to the ends of such cross chains and the chains are put in place on the standard circumferential band which constitutes the retaining means which keeps my chain in place on the tire.

The present invention is directed especially to an improved welding head and guideway for the chain, wherein a chain, having non-uniform links, may be fed, and the lugs may be welded thereon without seriously altering the position of the lugs on the links. This invention will become apparent from the following description, referring to the accompanying drawings, which illustrate a preferred embodiment thereof, and the essential novel features of the invention will be set out in the claims.

Figure 33:
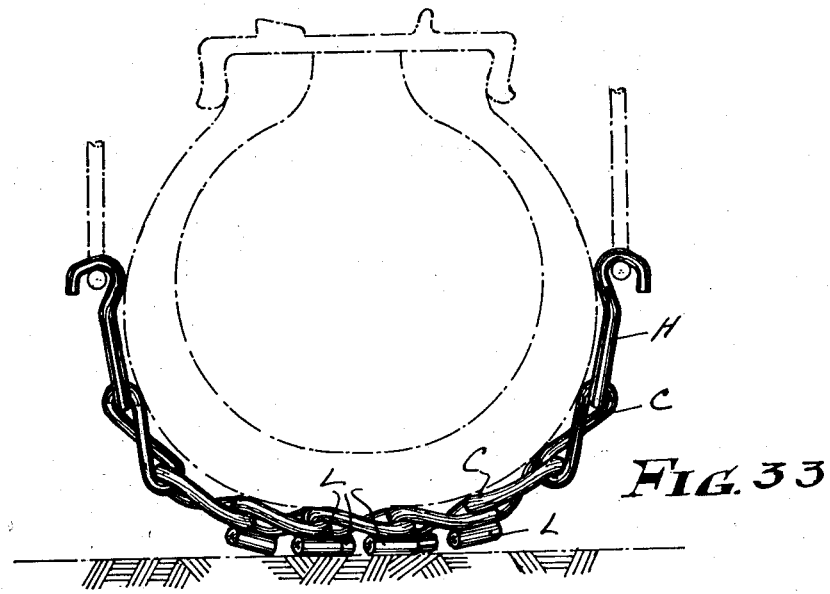
Figure 34:
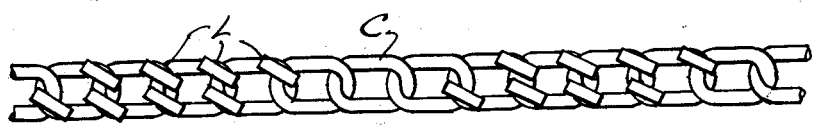
Figure 35:
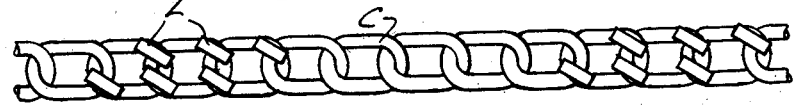
Figure 36:
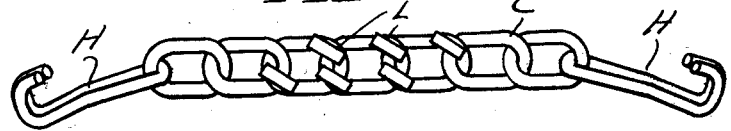
Figure 37:
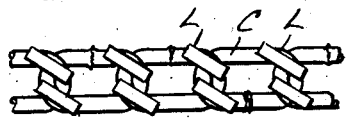
Figure 38:
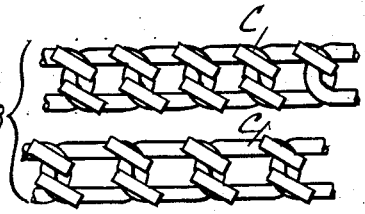

Referring to the drawings, Fig. 1 is a side elevation of a complete machine; Fig. 2 is a plan of the machine with certain of the parts, such as the transformer, the welding electrodes, their carrier and the lug feeding apparatus broken away; Fig. 3 is a vertical section of the machine, some of the parts being broken away, and is taken substantially along the lines 3—3 on Fig. 2; Figs. 4 and 5 are fragmentary sections, taken in substantially the same plane as Fig. 3, but illustrating some of the parts in different positions; Fig. 6, 7 and 8 are vertical sections, and are taken substantially along the lines 6—6, 7—7 and 8—8 respectively, on Fig. 2; Figs. 9 and 10 are enlarged sectional details, and are indicated by the lines 9—9 and 10—10 on Fig. 3; Fig. 11 is an enlarged section of an indexing mechanism shown in Fig. 3 and is indicated by the lines 11—11 on Fig. 6; Fig. 12 is a detailed section and is indicated by the offset line 12—12 on Fig. 1; Fig. 13 is an enlarged detail of the welding table, in which the chain is held during the welding operation; Fig. 14 is a plan view, on the same scale as Fig. 13, illustrating the guideway for the chain; Figs. 15 to 20 are vertical sections and are indicated by the correspondingly numbered lines on Fig. 13; Fig. 21 is a perspective of the unit on which the link rests during the welding operation; Figs. 22 and 23 are vertical sections through the unit illustrated in Fig. 21 and are indicated by the lines 22—22 and 23—23 on Fig. 14; Fig. 24 is a perspective of the portion of the lug feeding mechanism, the parts being separated to more clearly illustrate their construction; Figs. 25 to 29 inclusive, are diagrammatic illustrations of different stages of progress of lugs through the lug positioning and welding apparatus; Fig. 30 is a horizontal section, illustrating the electrode carrier arm and its mounting, and is indicated by the lines 30—30 on Fig. 1; Fig. 31 is a fragmentary side elevation of the electrode carrying arm illustrated in Fig. 30; Fig. 32 is a horizontal section, and is indicated by the lines 32—32 on Fig. 31; Fig. 33 illustrates the cross-chain in use; Figs. 34 and 35 are details of different forms of chains having lugs welded thereon, at various spaced intervals, illustrating some of the arrangements this machine is capable of producing; Fig. 36 is a plan of a completed cross chain; Fig. 37 is a plan, diagrammatically illustrating the irregularities found in the links of certain types of chains; Fig. 38 illustrates the position of the lugs on links of different lengths.

In the embodiment shown, there is provided a main frame 10, adapted to support the different units of the welding mechanism, namely, the power unit, the chain feed unit, the lug feed unit, the welding bed, the electrode assembly and transformer unit. The frame 10 comprises a table-like structure, having a top 11, supported by legs 12, which join the top with a base 14. The structure is provided with suitable cross frame or bracing members which serve to give it rigidity.

The power unit, which propels the various mechanisms hereinafter to be described, includes a motor 15, which is carried on the underside of the top 11. As illustrated in Figs. 1 and 2, the motor is provided with a suitable pulley 16, which, through the medium of a chain or belt 17, drives a pulley 18, mounted on the drive shaft 19 of a gear reduction unit 20. The gear reduction unit 20 is rigidly secured to the base 14, and drives a suitable power shaft 21 (Figs. 1 to 8 and 12). The power shaft 21 is journalled in suitable bearings 22 (Figs. 7 and 12) which are mounted on the base 14. The shaft 21 carries suitable cams hereinafter to be described, and which propel the various mechanisms of the machine.

The chain C, to the links of which the lugs are to be welded is supplied in substantially continuous lengths and stored in suitable containers or barrels, such as illustrated at 25, in Fig. 1. The chain passes from the container 25 upwardly through a guide loop 26, carried by a bracket 27, adjacent one side of the frame, and passes over a pulley 28. The pulley 28 is journalled on a shaft 29, which is mounted in the bracket 27. From the pulley, the chain passes through a suitable grooved guideway 30, and is held in contact therewith by a weighted arm 31, pivoted at 32 to brackets 33, which are rigidly secured to the frame top 11. The arm 30 is provided with a suitable extension 34, upon which is slidably mounted a weight 35, which may be adjusted to the position required to give the proper amount of tension on the chain, thereby retaining it in its guideway. From the guideway 30 the chain passes across the machine to a welding bed 50, which is mounted on top of the machine adjacent the left hand side, as shown in Figs. 1 and 2. This welding bed is provided with suitable guideways and feeding means, hereinafter described. From the guideway in the welding bed 50 the chain passes over a grooved pulley 51, which is rotatively journalled on a shaft 52 carried by a bracket member 53. The shaft 52 and the pulley 51 are driven from the power shaft 21, thereby at all times maintaining a frictional drive on the chain 51, tending to propel it across the machine. Rigidly secured to the shaft 52 is a pulley 54, which is connected by means of a flexible belt 55, to a pulley 56, rigidly mounted on the main power shaft 21.

To increase the frictional contact between the chain and the pulley 51, the latter is provided with a frictional band 57 (Fig. 3) of a material such as is ordinarily used for brake linings. It is also desirable to increase the length of contact between the chain C and the pulley 51. In the embodiment shown, this is accomplished by an idler pulley 58, carried in a bracket 59, which is secured to the frame. This idler pulley causes the chain to be wrapped around the periphery of the pulley 51. From the pulley 58 the chain passes downwardly into a suitable container, such as is shown at 25a, in Fig. 1. This arrangement is such that the frictional drive due to the constant rotation of the pulley 51 will not cause a feeding movement to be imparted to the chain, but will simply retain the chain taut over the welding bed, which is raised slightly above the top of the frame.

The chain C is fed across the table from right to left, (Figs. 1 and 2) by a suitable feeding arm or lever 60 (Figs. 1 to 5) which feeds a link or a predetermined number of links across the welding bed 50, once in each cycle of operation of the machine. The feeding arm 60 is pivotally mounted on a cross-shaft 61, carried by a bracket 62, secured to the base 14 of the frame 10. Adjacent the upper end of the lever 60 is a channel shaped member or shoe 63, arranged to guide the chain on the lever. The shoe 63 is interposed between the guideway 30 and the welding bed 50, and is in engagement with the chain at all times. Pivotally mounted on the shoe 63 is a pawl 64, having an upwardly extending tooth 65, which passes through a slot formed in the shoe 63, and which is adapted to enter the links of the chain C to cause them to be progressed across the top of the table.

When the arm 60 is drawn to the rear, the pawl 64 is withdrawn from engagement with the links in the chain by a suitable friction device. Such device is best shown in Figs. 3, 4, 5 and 9 and comprises a shoe 66, carried in a stud 67, which is pivotally mounted on a rearwardly extending arm 68 of the pawl 63. The shoe 66 is held in engagement with a rod 69, which passes through a slotted opening in the stud 67 by a suitable compression spring 70 carried in a recess in the stud 67. The rod 69 is pivoted at 71 to a bracket 72, mounted on the table 11. The pivot 71 is located some distance to the right of the lever 60 (Fig. 3) and the rod 69 is of such a length as to remain engaged by the shoe 66, at the extreme positions of the lever 60. The construction is such that as the lever 60 swings to the right (Fig. 5), the pawl 64 is rocked counter-clockwise, thereby withdrawing the nose 65 from the chain. The pawl is maintained in this position until the lever starts to swing in a reverse or forward direction (to the left in Fig. 3), at which time the pawl is rocked clockwise, thereby entering a link in the chain and carrying it forward with the lever.

The lever 60 is swung by a cam 75, which is rigidly mounted on the drive shaft 21. As illustrated in Figs. 3, 4, 5 and 12, the cam 75 coacts with a roller 76, which is rotatively mounted on a pin 77, carried by a lever 78 which is rockably mounted on the shaft 61. The lever 78 is drivingly connected to the lever 60 by a resilient connection, which, as shown in Figs. 3 and 12, comprises a rod 80 pivotally mounted on the lever 60, as at 81, and which passes through an ear 82 of the lever 78. A suitable compression spring 83 surrounds the rod 80 and serves to retain the levers 60 and 78 normally in contact with each other.

The resilient driving connection just described permits the forward stroke of the lever 60 which is adjustable. Such adjustment is effected by the threaded stud 84, (Figs. 3 and 6) mounted in a latch 85, which is pivoted to the welding bed 50, and which serves a purpose hereinafter to be described. The stud 84 is retained in an adjusted position by a lock nut 86. When the lever 60 reaches the end of its forward stroke (to the left of Fig. 3), it contacts with the stud 84 and causes the latch 85 to strike an abutment 87 on the bed 50, and thereby stops the movement of the lever 60. The stud 84 is so positioned as to limit the forward movement of the lever 60 in such a manner that the chain C will be carried forward to a predetermined position.

The feeding mechanism is so arranged that the welding mechanism may weld lugs on a selected number of consecutive links, and then skip a selected number of links, and so on. To accomplish this, it has been found most expedient to feed the chain a link at a time, until sufficient links have been consecutively fed to care for the predetermined number of lugged links, and then feed a plurality of links at one cycle of operation of the feeding mechanism, the last one of which links becomes the first link of the succeeding group of lugged links. The feeding operation described allows the machine to operate at a high speed as it permits the welding operation to be carried on during every cycle of operation of the machine, there being no extra cycles to feed the several links which do not require lugs to be welded thereon. This is accomplished by providing a variable rearward limit for the feeding arm 60, as about to be described.

In the construction illustrated, the feeding arm is positively driven in a feeding direction by the cam 75, but is returned by a spring 88, one end of which is secured as at 89, to the frame 10, and the other end of which is secured to the lever 60. The spring 88 serves to cause the roller 76 to remain in contact with the cam 75. When the links are fed one at a time, a pawl 90 pivoted to the lever 60, as at 91, strikes a suitable stop 92, and prevents rearward movement of the lever 60. However, when a plurality of links are to be fed, a stop 93, which is adjustably mounted on a cross-frame member 95, contacts with the lever 60, and prevents further rearward movement.

The arrangement of the stop 92 is such that it may be automatically withdrawn when a predetermined number of links have had lugs welded thereon, and is best illustrated in Figs. 3, 4, 5 and 11. To this end, the stop 92 is pivoted to a stud 94, secured to a frame member 95. The stop 92 has a downwardly extending arm 96, to which is pivoted a link or plunger 97. The plunger is slidably mounted in a bracket member 98, pivotally secured to the frame 95. The rearmost end of the plunger 97 coacts with a cam disk 99, and is normally held in contact with the periphery of the disk by the weighted end 100 of the lever 95. The periphery of the disk by the weighted end 100 of the lever 95. The periphery of the disk 99 is provided with two notches 101 and 102, and as the disk 99 is rotated the notches are presented to the plunger 97 and permit the weighted end 100 of the arm 92 to cause the plunger to be carried rearwardly, thereby swinging the stop 92 about its pivot and permitting the pawl 90 to pass over the top of the stop 92.

The pawl 90 passes idly over the stop 92 on the feeding movement of the arm 60. To this end the pawl 90 is pivoted as at 91 to the lever 60, and is held in position against a stop 105. Hence, the return movement of the lever 60 will cause the pawl to be cammed upwardly by the stop 92 without otherwise affecting the parts.

A suitable indexing mechanism is provided to rotate the disk 99. Referring to Figs. 3, 6 and 11, the disk 99 is rigidly mounted on a stub shaft 103, carried by a bracket 104, which is secured to the frame member 95 by suitable bolts 106. Rigidly secured to the shaft 103 is a ratchet wheel 107, which is adapted to be rotated by a pawl 108, carried by an arm 109, and retained in contact with the ratchet by a spring 110. The arm 109 is pivotally mounted on the shaft 103, and is swung back and forth, to feed the ratchet, by a lever 111 pivoted to the arm 109, as at 112, (see Figs. 6 and 11). The lever 111 carries on its lowermost end a cam ring 113, which embraces a cam disk 114, rigidly secured to the main drive shaft 21. The construction is such that the ratchet wheel 107 is caused to be moved a number of teeth for each cycle of operation of the machine.

The welding mechanism is so constructed that the number of links fed one at a time, may be varied. Hence, an adjustment is provided so that the number of ratchet teeth fed by the pawl 108 in each cycle of operation may be varied. If three links are to be fed consecutively, it is apparent that because there are two oppositely disposed notches in the cam disk 99, the ratchet wheel 107 must be given one-sixth of a rotation. Likewise, if there are to be four links fed consecutively, the ratchet must be given one-eighth of a rotation; for five links, one-tenth of a rotation, and so on. In the particular construction shown in the drawings, the ratchet wheel 107 has one hundred and twenty teeth. Acordingly, to feed three links, the ratchet must be advanced twenty teeth; to feed four links, fifteen teeth, five links twelve teeth.

To effect the variable feed of the ratchet wheel 107, I provide a guard 115, which is adjustable about the axis of the ratchet wheel, and serves to withdraw the pawl 108 at a variable point on the rear stroke of the pawl. The setting of the guard 115 therefore determines the number of teeth which will be picked up and advanced by the pawl 108.

The guard 115 is shown as rotatively mounted on the shaft 103, and as being adjustably positioned by means of a stop or spring pressed plunger 116, which coacts with recesses 117, 118 and 119, in the frame member 95. The recesses are so spaced as to cause the mechanism to feed three links, four links or five links, as is required. The guard 115 overhangs the ratchet wheel 107, as shown in Fig. 6, and is so positioned that the pawl 108 is lifted out of engagement with the ratchet wheel 107 on its return stroke, thereby reducing or regulating the number of teeth that will be fed by the forward movement of the pawl. A suitable detent pawl 120 pivotally mounted at 121 to an arm 123 is pressed against the ratchet by a spring 124 and acts to stop the movement of the ratchet and prevent it from overthrowing, thereby insuring an accurate speed.

The stop 93 (Fig. 3) is adjustably mounted in a slot 126 in the frame member 95, so that the lever 60 may be returned a distance equivalent to the number of links desired without lugs. For example, if it is desired to have lugs on four consecutive links, then five links without lugs, the stop 93 is set in the position shown in the drawings, namely to feed six links at a time.

In Fig. 3, the chain C is in position to have a lug welded on the first link of a group and the plunger 97 has passed the notch 101 by an angular distance of forty-five degrees or its equivalent of fifteen ratchet teeth on the ratchet wheel 107. On the first cycle of operation, the lugs are welded on the link so positioned, and the lever 60 swings back to again feed the chain. As the lever 60 advances to feed the next link the ratchet 107 is advanced an additional fifteen teeth and the plunger 97 is ninety degree from the notch 101. The lugs are welded on the next link and the return or non-feeding movement of the lever 60 is stopped by the member 92, which permits it on the next forward movement to feed only one link, simultaneously with the next feeding movement the ratchet 107 is advanced an additional fifteen teeth making a total of forty-five teeth, thereby carrying the notch 101 one hundred and thirty-five degrees from the plunger 97. The lugs are then welded on the third link. The stop 92 again engages the lever 60, and on the next forward movement feeds it one more link. The ratchet 107 is fed an additional fifteen teeth, making a total of sixty teeth, or one hundred and eighty degrees. Lugs are welded on this link, making four consecutive links with lugs welded thereon.

The ratchet has now been advanced a total of sixty teeth, and the notch 101 has been rotated one hundred and eighty degrees. However, at this period the plunger 97 enters the recess or notch 102, which is spaced diametrically opposite the notch 101, thereby withdrawing the stop 92 from the path of the pawl 90 and permitting the spring 88 to return the lever 60 beyond the stop 92 and into engagement with the stop 93. In the setting shown in Fig. 3, the stop 93 is positioned so as to permit the lever 60 to pick up six links and feed them across the welding table, bringing the sixth link into a position to have lugs welded thereon. This feeding movement will advance the ratchet fifteen teeth and the notch 102, forty-five degrees thereby bringing the stop 92 again into active position.

It is sometimes desired to vary the length of the links in such cross chains. The feeding mechanism is so constructed that it may be adjusted for various lengths of links. To this end the feed stop 93, which is mounted in the slotted openings 126, need only be set at the proper position of the slot. Likewise, the pawl 92 is adjustable in a slot 127 in the frame member 95. This slot 127 is so positioned and inclined that the movement at the end of the stop will be substantially horizontal, thereby enabling the feeding device to be adjusted to feed links of various lengths. The pawl 92 is provided with a hardened abutment member 128, which has a plurality of faces, either of which may be positioned to contact with the pawl 90 to vary the feeding stroke of the lever 60.

Immediately after the chain has been fed to the welding table 50, it is accurately positioned so that the lugs may be placed thereupon in proper relationship with the links. This is accomplished by means of a pilot member 130, which is best illustrated in Figs. 3, 6, and 13 to 17. The pilot 130 comprises a bar 131, slidably mounted in a vertically extending slot 132 in the frame of the welding table 50. The upper portion 133 of the pilot is of a reduced section, so that it will readily enter the links of the chain and provide sufficient clearance to prevent any binding action.

The pilot 130 is operated or reciprocated in an up and down movement by a cam 140 (Fig. 6) which is secured to the main drive shaft 21, and which rotates within a ring 141 of a beam 142. The ring 141 is located intermediate the ends of the beam, the rearmost end of which is pivoted as at 143 to a link 144, pivoted at 145 to a bracket 146 secured to the base 14 in the machine. The forward or left-hand portion 147 of the beam 142 (Figs. 6 and 12) carries a pivot pin 148, through an extended portion of which a link or rod 149 is slidably mounted. The upper end of the rod 149 is pivoted as at 150 to the pilot bar 131. Intermediate its ends, the rod 149 has a fixed collar 151. Between the collar 151 and the pivot pin 148 is a compression spring 152, which normally acts to retain the bar 131 in an uppermost position. As the arm 142 of the beam is rocked to a lowermost position, the pivot pin 148 coacts with a nut 153 on the rod 149 and positively draws the rod 149 and pilot 130 downwardly.

The welding table 50 comprises a bed 160, (Figs. 12 to 16) on which is mounted, as will hereinafter be described, suitable guide blocks 161 and 162, which form a channel 163. The upper end 133 of the pilot 131, when released, projects upwardly into the channel and into a link in the chain. The constantly rotating pulley 51, which frictionally engages the chain C, then causes a link to be drawn against the pilot, thus positioning the link longitudinally in the channel.

The pilot bar 131 (Fig. 6) is normally locked in its lowermost position by the latch 85, heretofore mentioned. This latch 85 is pivoted at 154 to the frame 50, and has a nose 155, which is normally held in engagement with the notch 156 in the plunger by means of a compression spring 157. When the feed lever 60 nears the ends of its feeding stroke (to the left in Fig. 3), it contacts with the stop pin 84, previously described, and swings the latch into a non-engaging position, thereby permitting the spring 152 which has previously been compressed by the upward movement of the beam 142 to snap the pilot bar 131 upwards through the links with great speed.

The upward movement of the pilot 130 is limited by the engagement of a collar 150a which is secured to the bar 130 as shown in Fig. 17 and which engages the lower face of the housing 50. To prevent undue jarring of the mechanism and eliminate possible displacement of the chain, a rubber block 151a is interposed between the collar 150a and the bed 50.

After the link has been position on the welding table, suitable lugs indicated at L in Fig. 12 are fed by means hereinafter to be described, which super-imposes the lugs upon opposite or diagonal corners of the links, as illsutrated in Fig. 12. Suitable electrodes of respectively opposite polarity are then brought into contact with the lugs and a welding current applied thereby simultaneously welding both lugs to the links, the link itself carrying the current from one lug to the other. Such electrodes may comprise a pair of bars, of copper or similar substances which is capable of conducting an electrical welding current with a minimum loss of voltage and amperage. The electrodes are arranged immediately above the lugs, which have been positioned on the links, and at the proper time are moved into engagement therewith, as will be hereinafter explained.

The channel 163 in the welding bed 160, shown in Figs. 12 to 18 inclusive, and heretofore referred to, comprises a guideway for the chain during its feeding movement and also serves to position the chains transversely of the machine during the welding movement. This channel is so constructed that it may be bodily shifted relative to the pilot and the electrodes, as well as relative to the chain itself. This channel is formed by a pair of blocks 161 and 162 (Figs. 12 to 16). The block 161 is L-shaped in cross section and is pivoted on a stud 164 which is secured to the bed 160 at 165. The faces 166 and 167 of the block 161 form the bottom and one side respectively of a guide channel 163. The other side of the channel 163 is formed by the bar or block 162, which is pivotally mounted on a stud 168 secured to the block 161, as at 169. The pilot 131 extends through an opening 170, in the block 161, which opening is slightly larger than the pilot and its associated parts. This construction permits the welding channel 163 to be bodily shifted relative to the pilot and permits the cross-sectional area of the channel 163 to be increased or decreased, as desired.

The position of the block 161 is limited by an adjusting screw 175 (Fig. 15) carried by a block 176, which is secured to the bed 160 adjacent the block 161, by a bolt 177, and which serves the purpose hereinafter to be described. The stop or adjusting screw 175 limits the movement of the block 161 in one direction. The block is forced against the adjusting screw by the bar 162, which is urged against the chain C by a plunger 178 (Figs. 13 and 16). The plunger 178 is slidably mounted in a block 179, carried by the bed 160. One end 180 of the plunger 178 is bevelled and is acted upon by a bevelled nose 181 of a vertically reciprocable bar 182, carried by the electrode carriers as will hereinafter be described.

The channel 163 is normally maintained in an opened or enlarged position to permit the movement of the chain therethrough during the feeding operation. To this end the bar 162 is normally retained in an open position (Fig. 12) by means of a spring 183, one end of which is connected with the bar 162 at 184, the other end of which is connected to a pin 185, carried by the block 179. After a link has been positioned against the pilot, suitable lugs indicated at L in Fig. 12, are fed by suitable means hereinafter described, which superimposes the lugs upon opposite or diagonal corners of the links. The bar 182 is then brought downwardly, thereby forcing the plunger against the bar 162 thereby gripping a link in the channel 163. Suitable electrodes are then brought into contact with the lugs, and a welding current applied.

In the embodiment shown in the drawings, and especially in Figs. 1, 30, 31 and 32, there are two electrodes 190 and 191. These electrodes are each adjustably mounted in substantially vertical slots 192 in electrode carriers 193 which are made of a material suitable for conducting the welding current to the electrodes. The electrode carriers are separated from each other by an insulating washer 194, which may be made of mica or other high grade insulating material. The carriers 193 are mounted between a pair of arms 195, by means of suitable bolts 196, which are insulated from the carriers by insulating sleeves 197. Interposed between each electrode carrier and the adjacent arm 195 is an insulating plate 199. Thus it will be seen that each electrode is insulated from the other, as well as from the various supporting mechanisms.

The electrodes 190 and 191 are mounted in their carriers 193 in such a manner that they may be readily loosened and removed by the loosening of the bolts 196. To this end, each vertical slot 192 is somewhat wider than its electrode, and a pair of bars 199 and 200 having suitable coacting wedge-shaped faces inserted in this opening, the result being that as the carriers are brought together by means of the bolts 196, the bars 199 and 200 slide along each other and wedge the electrode in place. Likewise, as the bolts 196 are loosened, the pressure on the wedge bars is relieved, permitting their separation, thereby eliminating the pressure upon the electrodes and permitting them to be readily removed.

In the embodiment shown, the lugs L are short cylindrical pieces, positioned at diagonally opposite corners of the links, and at an angle of substantially 27 degrees from the axis of the chain. Hence it has been found advantageous to mount the electrode carrying arms at an angle of 27 degrees from the path of movement of the chain, as illustrated in Fig. 2. The electrodes are mounted on the forward or left hand end of the arms 195

(Figs. 1 and 30), the rearmost ends of which are pivotally mounted on a pin 205, carried in an upstanding column or bracket 206 rigidly fixed to the frame 10 by suitable bolts 207. A sleeve 208 surrounding the pin 205 between the arms 195 serves to space the latter and retain them parallel.

The bar 182 which operates the plunger 178 and causes the bar 162 to grip the chain in the guideway, is carried by the electrode arms 195. As shown in Figs. 1, 16, 30 and 31, the bar 182 is slidably mounted in a vertical guideway 400 carried by the electrode arm 195a. The bar is normally retained in a lowermost position by a spring 401, one end of which is secured to the cover plate 402 of the guideway and the other end to a pin 403, carried by the upper end of the bar 182. The arrangement is such that the pin 403 coacts with the upper edge of the cover plate 402 to serve as a stop for the bar. This construction permits the initial downward movement of the arms 195 to cause the bar to cam the plunger 178, thereby gripping the chain in the guideway before the electrodes contact with the lugs. The continued downward movement of the arms 195 then stretches the spring 401, and thereby closing the guideway under spring pressure.

The electrode arms 195 are reciprocated or swung vertically in a manner which will raise the electrodes 190 and 191 clear of the lugs, and thereafter bring them down into contact with the lugs and then increase the pressure on the lugs while the welding current softens the chain, thereby insuring most advantageous welding of the lugs.

Pivotally mounted intermediate the ends of the arms 195 is a block 210, through which a bar or rod 211 passes (Figs. 6 and 30). The bar or rod 211 has a shoulder 212, which normally abuts the lower or bottom face of the block 210 while a reduced portion 211a of the rod 211 extends some distance above the block. The uppermost end 211a of the rod 211 is provided with a washer 214 and an adjusting nut 215, while disposed between the washer 214 and the block 210 is a suitable compression spring 216, which surrounds the rod and normally serves to retain the shoulder in position against the block. When the welding electrodes are moved upwardly the shoulder 212 is forced against the block 210, thereby swinging the arms 195 upward, thus carrying the electrodes a short distance above the chain to a position where the chain may be fed or advanced without interfering with the electrodes. When, however, the rod 211 is moved downward to bring the electrodes into contact with the lugs, the arms 195 move downward until the electrodes abut the work, and then as the heating current is applied to the electrodes, further downward movement of the rod 211 causes a compression of the spring 216, thereby increasing the pressure of the electrodes on the lugs and forming the welds under compression.

The electrode carrying arms 195 and their respective electrodes are operated from the main drive shaft 21. As shown in Fig. 6 the rod 211 is pivotally connected as at 219, to an ear 220, on the ring 141 of the beam 142, which is swung or oscillated by the cam 140 on the main drive shaft, as heretofore described.

A suitable stop is provided to prevent excess pressure of the electrodes on the lugs and links, and thereby prevent undue distortion of the lugs. In the drawings, this stop comprises a frame member 211, mounted on top of the frame 10 and through which the rod 211 passes. The member 221 is internally threaded and is provided with a sleeve 222, having a head 223, which may be adjusted up and down and locked in an adjusted position by a suitable lock nut 224. The inner diameter of the sleeve 222 is somewhat greater than the outer diameter of the rod 211, hence the sleeve 222 will not interfere with the slight swinging movement of the rod. The sleeve 222 is adjusted so that the head 223 contacts with the lower surface of the block 221 when the electrodes have reached the lowermost position consistent with a good weld combined with a minimum amount of distortion of parts. Thereafter, continued movement of the rod serves only to compress the spring 216 and has no further affect on the arms 195 or the parts welded.

The angular movement, due to the swinging of the electrode carrier in a plane, which is 27 degrees from the path of the chain, and the axis of the pivot 219 of the rod 211 is very slight. Hence, because of the comparatively great length of the rod 211, a small amount of loose play in the pivot 219 readily cares for this movement without effecting the operation of the parts.

The electrode carriers 193 are preferably hollow and are provided with suitable connections for a cooling liquid, such as water. As shown in Figs. 1, 30 and 31 of the drawings, each electrode carrier 193 comprises a hollow casting. A flexible conduit 233 (Figs. 1, 29 and 30) connects one of the electrode carriers 193 to a suitable source of supply, such as a water line 234 which may lead from a suitable pump (not shown) and a conduit or tube 235 connects this electrode carrier to the other carrier, which is connected by a suitable flexible conduit 236 to a tube 237, leading to a drain.

A suitable source of welding current is supplied. When alternating current is used, a low voltage transformer is provided, such as is generally indicated by the dotted line 240 on Fig. 1. The transformer 240 may be supported in any manner convenient. As it is desirable to keep the lead to the transformer from the electrodes as short as possible and thereby prevent line losses, the transformer 240 is preferably supported on the frame 10 by suitable upstanding legs 241 and flexible leads 252 are used to connect the output coil of the transformer with the electrodes.

To minimize the cost of electric current, it is desirable that the welding current be supplied to the transformer only during the welding operation. To this end, one side of the input line, leading to the primary winding of the transformer 240, is connected by a line 245 with one contact 246 of a switch 247 (Fig. 8) and a connection 248 leads from the other contact 249 of the switch to the source of current.

The switch 247 may be of any suitable construction which will prevent excessive arcing at the contacts. Referring to the drawings, and especially Fig. 8, the switch 247 comprises a contact member 246, carried by an arm 260, which is pivoted on a shaft 261 carried by suitable bearings 262, secured to the frame 10. The other contact point 249 is carried by an arm 263, pivoted to the shaft 261, and which is oscillated to and from the arm 260 by means of a yoked bar 265. The bar 265 is pivoted as at 266 to the arm 263, and its yoked end 267 embraces the power shaft 21. Intermediate the ends of the bar 265 is a roller 268, adapted to engage the periphery of a cam 269, which is rigidly secured to the shaft 21. The cam 269 is so arranged that it will force the contacts 246 and 249 towards each other, at the time the electrodes reach the work, and will separate the contacts as soon as the weld is completed.

The lugs L are fed to the welding table through a pair of tubes 270 from a suitable feed hopper 275, Fig. 1. The feed hopper may be of any of the types commonly used to feed small articles to an automatic machine. It generally comprises a hopper portion 276, the interior of which communicates with a feed wheel (not shown) but contained within the housing 277.

The feed wheel is rotated by a suitable gearing mechanism which is mounted in a housing 278, and which is driven by a pulley 279. The pulley 279 is driven from the power shaft 21 by means of a pulley 280, rigidly mounted on the power shaft, and connected to the pulley 279 by suitable flexible driving means, such as the belt 281. Such hopper mechanism is more fully described in my copending application, Serial No. 502,362, and is of such a type that the tubes are maintained filled with lugs at all times.

The tubes 270 are so arranged as to feed the lugs to suitable channel bars carried by the blocks 176 and 176a, which are secured to the table 160, and which support the mechanism which positions the lugs on the chain. Each of the blocks 176 and 176a is provided with a channel 300 (Figs. 13, 15, 19 and 20), which channels extend at an angle of 27 degrees from the path of the chain and normal to the axis of the lugs. The channels 300 are disposed on opposite sides of the guideway 163 and are offset relative to each other so that the lugs may align with the diagonal corners of the links, as shown in Fig. 13. Slidably mounted in each channel 300 is a channel-shaped bar 301, each of which carries a flat plunger bar 302, and is covered by a suitable cover plate 303, having a notch 304, which engages an upstanding lug 305 on the channel bar 301. A cover plate 306 is superposed on the blocks 176 and 176a, over each of the grooves 300. The cover plates 306 are held in position by set screws 307, and act to retain the channel bars and plungers within their respective grooves 300 the plungers 302 and channel bars 301 being reciprocated in their grooves by a suitable mechanism, hereinafter described.

When the chain is being fed across the table 50, the plungers 302 are drawn away from the chain, and one end of a recess 310 in each plunger 302 engages a pin 311, mounted in the corresponding channel bar 301, and withdraws the bar, in which position the lugs "L" are fed by gravity from the tubes 270 into the channel bar. It will be noted that the ends of the tubes 270 are mounted in bars 315, which are secured to the blocks 176 and 176a, by suitable bolts 316. The extreme end of each tube 270 projecting through a slot 317 in the wall 318 of its corresponding channel bar 301. Hence, as the plunger 302 is withdrawn, a lug falls into the channel 319 in the channel bar, immediately in front of the plunger 302. As the lugs are fed into position in the channel bars, they underlie flat springs 320, carried by the under face of the caps 303, and which serve to keep the lugs in contact with the channel bars and retard their movement, thereby preventing inadvertent displacement, due to the speed of the mechanism. In this position the bottom face of each lug lies in a groove 322, which is cut in the face 323 of the channel. This groove is normal to the axis of the channel and parallel with the axis of the lug. Hence, the groove serves to align the lug in the channel. As the lug is shoved out of the groove, it lies in a plane slightly above the top face of the link, and as the plunger bar 302 is moved towards the link, it pushes the lug beneath the spring towards the link.

The lug is aligned lengthwise by a flat spring 325 and a cammed face 326 of the side wall 318 of the channel bar 301. As the lug is progressed from the groove 322, its end is engaged by the flat spring 325, which forces the other end against the beveled face 326 of the side wall 318, against which the end of the lug rides onto the face 327 of a projecting end 328 of the side wall 318 in which position the lug is clear of the bottom wall 323 of the channel bar 301 and is gripped between the spring 325 and the projection 328.

The operation of the lug feed will be best understood from Figs. 13, 15, and the diagrammatic illustrations shown in Figs. 25 to 29, inclusive. First, the chain is fed across the table to position a link to which the lugs are to be welded, while the channel bars 301 and the plungers 302 are in their retracted positions. Simultaneously, lugs are fed by gravity into each of the channel bars 301 immediately in front of the plungers 302 and beneath the springs 320. Next, the pilot 130 enters the link C and the link is positioned against the pilot. The plungers 302 next move along the channels 301 to push the lugs L from beneath the base portion 323 of the channel bars and into the grip of the ears 328 and the springs 325 (Fig. 24). Further movement of each plunger causes a roller 330, which is secured to the plunger 302 at 331, to contact with the channel and urge the channel forward carrying the lugs to a position immediately above the link L. The forward movement of the channel bars 301 is then stopped by a roller 332 secured to the bar 301 and which contacts with the bevelled surface of an adjustable block 333, thereby accurately positioning the lug on the link. The lug remains in such position, gripped between the projection 328 and the spring 325, until the electrodes 190 and 191 descend and grip the lugs as shown in Fig. 28. Thereafter the electrodes retain the lugs in position on the links during the welding operation, while the channel bars 301 and their respective plungers 302 are withdrawn and into a position ready to engage the next lug. When the pilot 130 is in its extreme uppermost position, it is a short distance below the top of the lug, thereby preventing contact between the pilot and the electrodes. As shown in Fig. 30, the pilot 130 and plunger 302 are withdrawn immediately after the electrodes contact with the lug and the welding operation then takes place. Thereafter, two more lugs are fed to the channel bars 301, and the chain is advanced, bringing another link into position to be engaged by the pilot and the cycle of operation begins anew.

The lug feed, namely the plungers 302 and their associated mechanisms is operated from the main driving shaft 21. Each plunger 302, as is shown in Figs. 2, 13 and 24, has a hook portion 340, which projects from the outer ends of the respective channels 300. The hook 340 embraces the rounded ends 341 of arms 342, which are rigidly secured to shafts 343. The shafts 343 extend vertically through the welding bed 50. Rigidly secured to the shafts 343 below the welding bed are suitable horizontal arms 344, which are connected by links 345 to levers 346. The levers 346 are rigidly secured to a common rock shaft 347, which is mounted in suitable bearing brackets 348, secured to the main frame 10, as shown in Figs. 2 and 7.

The rock shaft 347 is operated by a cam mechanism which is associated with the main driving shaft 21. Rigidly secured to the rock shaft 347 is a lever 349, Fig. 7, which is pivotally connected to one end of a bar 350, the other end of which is forked as at 351, and slidably embraces the shaft 21. The bars 350 carry a roller 352 which is held in engagement by a tension spring 354, with a cam 353, which is secured to the main drive shaft 21. One end of the spring 354 is secured to the bar 350, as at 356. As the cam 353 is rigidly mounted on the shaft 21, it will be seen that the roller 352 will drop into a recess 357, once for each cycle of operation of the machine, namely, one for each revolution of the shaft 21, thereby causing the lugs to be fed by the plungers 302 to the chain links as heretofore described.

It has been found highly desirable to provide the welding bed 150 with means to prevent twisting, warping or other deformation of the links during the welding of the links. To this end, the welding channel 163 is provided with a block or anvil 360 on which the link is positioned during the welding operation. This block or anvil 360 is best illustrated in Figs. 14, 15, 17, 22 and 23. The upper face of the block has a raised portion 361, on which the diagonal corners of the links are supported through the medium of the adjacent link, and over which the lug is positioned. The block has also upstanding ears 362 which support the intermediate portions of the link during the welding operation. The construction of the block is such that the upper face thereof, generally conforms to the contour of the link and the underlying portions of the adjacent connecting links, and therefore supports practically the entire link. Due to this support, the link, when heated by the welding current, is given a predetermined set or form and deformation of the link is prevented. Likewise, previously deformed links are given the proper set or form during the welding operation.

The anvil 360 is supported so that it may be removed from the welding channel 163 during the feeding movement of the chain, and therefore prevent the uneven contour of the anvil from retarding the movement of the chain. As shown in the drawings, the anvil 360 is welded or otherwise secured to a U-shaped bar 365, which is adapted to surround the pilot bar 131, while an opening 366 in the anvil permits the upper end 133 of the pilot to project through the anvil and into the link positioned thereon. The bar 365 is slidably mounted in the bed 50 adjacent the upper end of the pilot bar 131, and is normally retained in a lowermost position, with the upper face of the anvil below the channel 163 by a suitable spring 369, one end of which is secured to the pin 368, carried by the bar 365, and the other end of which is secured to the block 150a, which is carried by the pilot bar 131, as heretofore described, and which spring acts to retain the lower face of the bar 365 against an abutment 371. When the pilot bar 131 is raised by the release of the latch 85, as heretofore described, the upper end or shoulder 369 of the bar strikes the lower surface 370 of the anvil, and as the spring 152 is of much greater strength than the spring 367, the anvil is carried upward into the channel 163 by the pilot.

As the pilot is withdrawn before the welding operation is complete, suitable mechanism is provided to retain the anvil 360 in its uppermost position, until the welding operation is complete. As shown in Figs. 14 and 15, this mechanism comprises a block 380, which is slidably mounted in the member 16, and which is pressed into a notch 381 in the anvil 360, by means of a suitable leaf spring 383. Hence, the pilot may be withdrawn without disturbing the position of the anvil.

When the welding operation is complete, the anvil is released. As shown in Figs. 14 and 15, the block 380 is carried on a pin 385, which is secured to the bar 162, and passes through a slotted opening 386 in the block 161. Hence, after the welding operation is complete, and the bar 162 is withdrawn, as heretofore described, the pin 385 will act on the block 380 and cause it to be withdrawn from the notch 381, thereby permitting the spring 367 to return the anvil to its lowermost position.

The lug feeding positioning mechanism is so constructed that it will feed and position links or lugs to links of chains wherein the length of the links in one chain varies from the length of the links in the other chain. Fig. 38 indicates two such chains. It will be noted that the lugs on the chain C1 are spaced somewhat further apart than the lugs on the chain C2. Hence, the blocks 176 and 176a are mounted on the bed 160 in such a manner that they may be shifted lengthwise relative to the chain C. To this end the blocks 176 and 176a have downwardly extending ribs 390, which are adapted to slide in channels 391 in the bed 160. Likewise, the openings through which the bolts 177 pass, are slotted, as is shown in Figs. 13, 15 and 20. This permits each lug-feeding mechanism to be moved bodily relative to the other and therefore permits the lugs to be positioned on various lengths of links.

As the blocks 176 and 176a are moved, it becomes necessary to slightly vary the stroke of lug feed operating mechanism. Hence, the links 345, which form part of such mechanism, as heretofore described, are constructed in the nature of a turnbuckle, so that they may be lengthened or shortened to compensate for the movement of the blocks 176 and 176a. Likewise, the lug feeding tubes 270 are slidably mounted in the bars 315, and as these tubes normally project some distance into the side walls of the channel bars 301 they may be moved some distance one way or another without altering the results. As these lugs are positioned within the channel bars, as heretofore described, they will be located on the links in the desired positions.

I will now summarize the mutual timing of the various mechanisms involving the machine, reference being had to views showing the parts and also in which we will assume that the parts are in the following position: The feed lever 60 is in its rearmost position as shown in Fig. 5, and ready to start forward to engage the chain for a new purchase thereon. The lug feeding mechanism is idle. The electric current control switch is in an "on" position. The electrodes 190 and 191 are leaving contact with the lugs, while the electrode carrying arms 195 are being raised free from the links which have previously been welded. The operation of the machine from this position is as follows:

The switch contacts 246 and 249 (Fig. 8) are separated, thereby cutting the current from the electrodes 190 and 191. The electrodes are then carried upwards, clearing the lugs, which movement causes the release of the anvil 360. Next the chain feeding arm 60 functions. The lug feed next comes into operation to initiate the feeding movement of the lugs from the channels 301 to their respective positions on the chain. When the lug is being fed the chain feed stops, and the pilot 130 and the anvil 360 snap into place. The electrode supporting arms 195 then start downward, and the plunger mechanism, shown in Fig. 16, starts into action to close the arm or bar 160 against the bar 161, thereby gripping the links in the channel 163, and positioning it relative to the lug. The continued downward movement of the arms 195 brings the electrodes into contact with the lugs. The lug feeding mechanism and pilot then withdraw and the heating switch 217 is turned on. Continued downward movement of the electrode arms 195 applies pressure to the spring 190 to the lug, and the welding current causes the welding of the lugs to the link. While the weld is being made, the feed lever 60 starts on its return movement to pick up another link. The cycle of operation is then complete and the next feeding movement of the chain begins another cycle.

It will be understood from the description I have given of the embodiment shown in the drawings, that I have provided means for rapidly and accurately applying lugs to a selected group of links on a continuous chain, even though the links are of various lengths, or lack uniformity in shape or cross section, such as links made by a welding process. Thereafter, by simply separating the chain into sections in intermediate plain links and mounting attaching hooks H, I may produce a cross chain, as indicated by Figs. 33 and 36. The number of lugged links and the number of plain links may be readily varied, as desired. Thus, Fig. 34 indicates a chain having 4 lug links and then 3 unlugged links, while Fig. 35 indicates a chain having 3 lug links and 5 unlugged links. By taking the different chains, produced as indicated by Figs. 34 and 35, and severing through plain links, one can obtain a different number of links in the lugged group and also a different number of links in the plain group at opposite ends of the lugged group. Ordinarily, it is preferable to provide an odd number of links in the plain group and to sever the middle link of said group so as to leave the same number of plain links on each end of the short section produced.

It may be noted that a method of making tire chains which may employ the mechanism forming the subject matter of this application, is set out and claimed in my co-pending application Serial No. 560,970, filed September 3rd, 1931, as a division of my earlier application, Serial No. 502,362, heretofore mentioned.

I claim:—

1. In a welding machine, the combination with a guideway for work, of means to grip the work, a plurality of means adapted to simultaneously bring a plurality of metallic parts into contact with the work, and wherein one of said last named means is bodily shiftable relative to another one of said last mentioned means.

2. In a welding machine, in combination with a guideway for work, of means to grip the work, a plurality of means adapted to bring a plurality of metallic parts simultaneously into contact with the work, and wherein one of said last named means is bodily shiftable in a direction parallel with the guideway.

3. In a welding machine, in combination with a guideway for work, of means to grip the work, a plurality of means adapted to bring a plurality of metallic parts simultaneously into contact with the work, and wherein one of said last named means is bodily shiftable to vary the position of the metallic parts relative to each other.

4. In a welding machine, a guideway through which work is progressed, said guideway including a plurality of means adapted to simultaneously superimpose a plurality of metallic parts on the work, each of said last named means being bodily shiftable relative to the guideway.

5. In a welding machine, a guideway through which work is progressed, said guideway including a plurality of means adapted to simultaneously superimpose a plurality of metallic parts on the work, each of said last named means being bodily shiftable in a direction parallel with the guideway and independently of each other.

6. In a welding machine adapted to weld lugs to the links of a chain, a guideway through which the chain is progressed at stated intervals, means to grip the chain in the guideway, and a plurality of means adapted to simultaneously superimpose lugs on a link of the chain, and one of said last named means being bodily shiftable relative to another of said means whereby the distance between the superimposed lugs may be varied.

7. In a welding machine, the combination of a welding bed, a guideway in the bed and through which the work is progressed, means adapted to bring metallic parts into contact with the work, and an anvil movably mounted in the guideway and adapted to support the work during the welding operation.

8. In a welding machine, the combination of a welding bed, a guideway mounted on the bed through which the work is progressed, means disposed on opposite sides of the guideway adapted to simultaneously bring metallic parts into contact with the work, and an anvil movably mounted in the guideway and adapted to support the work during the welding operation.

9. In a welding machine, the combination of a welding bed, a guideway movably mounted on the bed and through which the work is progressed, means to position work in the guideway, means adapted to bring metallic parts into contact with the work, an anvil in the guideway adapted to support the work during the welding operation wherein said anvil and guideway are movable relative to each other.

10. In a welding machine, the combination with a frame of a guideway through which work is progressed, a movably mounted slide, means adapted to feed a metallic part to said slide and means to cause the metallic part to be first ejected from the slide and thereafter to be superimposed on the work.

11. In a welding machine, the combination with a frame of a guideway through which work is progressed, channels in the frame associated with the guideway, each of said channels having a slide movably mounted therein, means adapted to feed metallic parts to said slide, bars carried by said slides, means to cause relative movement between the bars and their respective slides, and wherein said means first causes the metallic parts to be ejected from the slide and thereafter causes the metallic parts to be superimposed on the work.

12. In a welding machine, the combination with a frame of a guideway through which work is progressed, a channel associated with the guideway, said channel having a slide movably mounted therein, means adapted to feed metallic parts to the slide, a bar carried by said slide, means to cause relative movement between the bar and its slide, said means acting to first cause a metallic part to be ejected from the slide and thereafter causes the metallic part to be superimposed on the work in a predetermined position, and means to retain the metallic part in position on the work until the welding operation has started.

13. In a welding machine, a guideway through which work is progressed, a slide having forwardly projecting ears, means adapted to feed a metallic part of said slide, means to cause the metallic part to be ejected from the slide and gripped between said ears and cause the metallic part to be superimposed on the work.

14. In a welding machine, the combination with a frame, of a guideway through which work is progressed, a channel associated with the guideway, said channel having a slide movably mounted therein, said slide having forwardly projecting ears, one of said ears being resiliently movable relative to the other, means adapted to feed metallic parts to said slide, a bar carried by said slide means to cause relative movement between the bar and the slide, wherein said means causes the metallic parts to be ejected from the slide and superimposed on the work, means including said ears adapted to align the metallic part in the slide in one direction, and a groove in the slide, resilient means acting to cause the metallic part to contact with said groove and align the part in a direction normal to said first named direction.

15. In a chain welding machine, the combination with a frame, of a guideway through which the chain is progressed, channels in the frame associated with the guideway, each of said channels having a slide movably mounted therein, each slide having a forwardly projecting ear, means adapted to feed lugs to said slide, a spring adapted to coact with said ear to align the lug relative to its axis, bars carried by said slide, means to cause relative movement between the bars in their respective slides, wherein said means first causes the lugs to be ejected from the slide and gripped between said ears and their respective springs and thereafter causes the lugs to be superimposed on the chain in a predetermined position relative to the links thereof, electrodes adapted to contact with the lugs to weld them to the chain, and a means acting after the contact between the electrodes and the work to withdraw the slides and their associated parts.

16. In a welding machine, a guideway through which work is progressed, a pair of welding electrodes associated with said guideway, means adapted to move the electrodes into contact with the work in said guideway, an anvil, means whereby said anvil is brought into contact with the work before the electrodes contact with the work.

17. In a welding machine, a guideway through which work is progressed, an electrode associated with the guideway, said guideway having one wall movable relative to the others, whereby the work may be gripped in the guideway, resilient means acting on said movable wall to cause it to grip the work and thereby position the work in one direction, and positioning means adapted to position the work in a second direction.

18. In a welding machine, a guideway through which work is progressed, an electrode associated with the guideway, said guideway having one wall movable relative to the others, resilient means acting on said movable wall to cause it to grip the work and thereby position the work in one direction, positioning means adapted to be projected into the guideway and through an opening in the work and thereby position the work in a second direction, and an anvil on which the work rests during the welding operation.

19. In a welding machine, a guideway through which work is progressed, an electrode adapted to engage work in the guideway, a carrier for said electrode, said guideway having one wall movable relative to the others, means carried by the electrode carrier and adapted to act on said movable wall to cause it to grip the work in the guideway.

20. In a welding machine, a guideway through which work is progressed, an electrode adapted to engage work in the guideway, a carrier for said electrode, said guideway including means to grip the work, means carried by the electrode carrier and adapted to act on said gripping means to cause it to grip the work in the guideway before the electrode contacts with the work.

21. In a welding machine adapted to weld lugs to a chain, a guideway for the chain, feeding means adapted to progress the chain through the guideway, a movable anvil adapted to support the chain during the welding operation, and means to withdraw the anvil after the welding operation has been completed.

22. In a welding machine adapted to weld metallic parts to the work, a guideway for the work, an anvil reciprocably mounted in the guideway and adapted to support the work during the welding operation, means to withdraw the anvil from the guideway after the welding operation has been completed and feeding means adapted to progress the work after the anvil is withdrawn.

23. In a welding machine adapted to weld lugs to a chain, a guideway for the chain, feeding means adapted to progress the chain through the guideway, an anvil reciprocably mounted in the guideway and adapted to support the work during the welding operation, a plunger reciprocably mounted in the guideway and adapted to project through said anvil and enter the chain.

24. In a welding machine adapted to weld lugs to a chain, a guideway for the chain, feeding means adapted to progress the chain through the guideway, an anvil reciprocably mounted in the guideway, a latch to retain the anvil in its withdrawn position, said feeding means adapted to act to release the latch and cause the anvil to contact with a link, and means adapted to cause the withdrawal of the anvil after the welding operation has been completed.

25. In a machine adapted to weld lugs to a chain, the combination with means for guiding and feeding the chain of a plunger, a latch to retain the plunger in its withdrawn position, means adapted to cause the plunger to enter an opening in a link of the chain, said feeding means adapted to act to release the latch causing the plunger to enter the opening in the link, means to withdraw the plunger from the chain, a movable anvil and a latch adapted to restrain the withdrawal of the anvil until after the welding operation has been completed.

26. In a welding machine, a guideway including side walls and bottom walls through which the work is progressed, a welding electrode adapted to weld metallic parts to the work, means to move the electrode into contact with the work in the guideway, means whereby the guideway may be bodily moved relative to the electrode, and means whereby one wall of the guideway may be moved relative to another wall and thereby grip the work in the guideway.

27. In a machine adapted to weld lugs to the links of a chain, a guideway for the links, feeding means adapted to superimpose lugs on a link of the chain, said lug feeding means adapted to feed lugs of varying lengths, means associated with said lug feed to cause one end of each lug to be placed in a predetermined position on a link of the chain relative to the ends of said link.

28. In a welding machine adapted to weld metallic parts to the links of a substantially continuous chain, an anvil adapted to support the link to which the parts are welded, and wherein said anvil presents a bearing surface to the link and the connecting portions of the adjacent links thereby preventing deformation of the link structure.

29. In a welding machine adapted to weld metallic parts to the links of a substantially continuous chain, a movable anvil to support the chain during the welding operation, a pilot carried by the anvil and smaller than the opening in the links and adapted to enter a link in the chain, and means gripping the chain and adapted to draw it into contact with the pilot.

30. In a welding-machine adapted to weld metallic parts to the links of a chain, a welding bed, means disposed ahead of the welding bed to feed the chain thereto and a friction device engaging an advance part of the chain, and a second friction device engaging the opposite parts of the chain to retain the chain taut across the welding bed, during the idle movement of the feeding means.

In testimony whereof, I hereunto affix my signature.

MERRITT R. WELLS.